US011450864B2

(12) United States Patent
Onuma et al.

(10) Patent No.: US 11,450,864 B2
(45) Date of Patent: Sep. 20, 2022

(54) FUEL CELL (71) Applicant: Panasonic Intellectual Property Management Co., Ltd., Osaka (JP)

(72) Inventors: Shigenori Onuma, Kyoto (JP); Tomohiro Kuroha, Osaka (JP); Takehito Goto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 553 days.

(21) Appl. No.: 16/296,168

(22) Filed: Mar. 7, 2019

(65) Prior Publication Data
US 2019/0305332 A1    Oct. 3, 2019

(30) Foreign Application Priority Data

Apr. 3, 2018 (JP) .............................. JP2018-071611

(51) Int. Cl.
*H01M 8/0282* (2016.01)
*H01M 8/021* (2016.01)
(Continued)

(52) U.S. Cl.
CPC ......... *H01M 8/0282* (2013.01); *H01M 8/021* (2013.01); *H01M 8/0215* (2013.01);
(Continued)

(58) Field of Classification Search
CPC ............... H01M 8/021; H01M 8/0215; H01M 2008/1293
See application file for complete search history.

(56) References Cited

U.S. PATENT DOCUMENTS 6,444,340 B1 * 9/2002 Jaffrey ................ H01M 8/0204
429/456
2012/0316052 A1 * 12/2012 Akamatsu ................ C03C 8/14
501/15
(Continued)

FOREIGN PATENT DOCUMENTS

JP        5-330935 A    12/1993
JP    2009-185387 A     8/2009
(Continued)

OTHER PUBLICATIONS

Extended European Search Report dated Aug. 6, 2019 for the related European Patent Application No. 19162716.5.

*Primary Examiner* — Maria Laios
(74) *Attorney, Agent, or Firm* — McDermott Will & Emery LLP (57) ABSTRACT

The fuel cell of the present disclosure includes: a fuel single cell comprising a fuel electrode, an air electrode, and an electrolyte disposed between the electrodes; a separator for separating a fuel gas flowing through the fuel electrode and air flowing through the air electrode; and a sealing portion for hermetically bonding between the separator and the electrolyte, wherein the sealing portion is constituted of a glass composition containing at least two of metallic or metalloid elements contained in the electrolyte and at least two of metallic or metalloid elements contained in the separator; the electrolyte includes a proton conductor; and the proton conductor is represented by a compositional formula: $BaZr_{1-x}M_xO_3$, where $0.05 \leq x \leq 0.5$; and M is at least one selected from the group consisting of Sc, In, Lu, Yb, Tm, Er, Y, Ho, Dy, and/or Gd.

17 Claims, 6 Drawing Sheets

(51) Int. Cl.
*H01M 8/0215* (2016.01)
*H01M 8/0228* (2016.01)
*H01M 8/1253* (2016.01)
*H01M 8/0273* (2016.01)
*H01M 8/242* (2016.01)
*H01M 8/1246* (2016.01)
*H01M 8/12* (2016.01)

(52) U.S. Cl.
CPC ....... *H01M 8/0228* (2013.01); *H01M 8/0273* (2013.01); *H01M 8/1246* (2013.01); *H01M 8/1253* (2013.01); *H01M 8/242* (2013.01); *H01M 2008/1293* (2013.01); *H01M 2300/0074* (2013.01); *H01M 2300/0077* (2013.01)

(56) References Cited

U.S. PATENT DOCUMENTS

| | | | |
|---|---|---|---|
| 2013/0294818 | A1 | 11/2013 | Goedeke |
| 2015/0125780 | A1 | 5/2015 | Kim et al. |
| 2015/0318563 | A1 | 11/2015 | Kuribayashi et al. |
| 2016/0344054 | A1* | 11/2016 | Kamata ............... H01M 8/1253 |
| 2017/0288251 | A1 | 10/2017 | Kamata et al. |
| 2018/0294489 | A1 | 10/2018 | Morikawa |
| 2019/0036131 | A1* | 1/2019 | Hiraiwa .................. H01M 8/12 |

FOREIGN PATENT DOCUMENTS

| | | | |
|---|---|---|---|
| JP | 2015-022892 | A | 2/2015 |
| JP | 2017-135090 | A | 8/2017 |
| JP | 2017-188440 | A | 10/2017 |
| JP | 2015-022892 | * | 2/2022 |
| WO | 2011/105519 | | 9/2011 |
| WO | 2016/178394 | | 11/2016 |

\* cited by examiner

FUEL CELL

BACKGROUND

1. Technical Field

The present disclosure relates to a fuel cell including a fuel cell stack generating electric power from air and fuel.

2. Description of the Related Art

Fuel cells are compact and have high power generation efficiency and further can enhance the overall efficiency by utilizing the heat during power generation, and are therefore used as devices for distributed power generation systems. In particular, solid oxide fuel cells (hereinafter, referred to as SOFCs), which are operated at high temperatures, show high power generation efficiency accounting for the overall efficiency and are therefore being developed as devices for distributed power generation systems focused on power generation.

A single cell of a SOFC is composed of a fuel electrode, an air electrode, and an electrolyte, and a fuel gas and air (oxidant gas) are supplied to the fuel electrode and the air electrode, respectively. The single cell also includes a separator for separating the fuel gas and air to be supplied (for example, International Publication No. WO 2016/178394: PTL 1). In the fuel cell stack disclosed in PTL 1, the separator has a frame-like shape having a hole at the center and is disposed such that the rim portion faces the peripheral surface of the electrolyte on the air electrode side. A bonding portion (sealing portion) is provided between the facing portions, and the separator and the electrolyte are bonded to each other via this bonding portion. In such a configuration of the fuel cell stack disclosed in PTL 1, an air distribution region facing the air electrode and a fuel gas distribution region facing the fuel electrode are divided from each other to prevent leakage of gas from one electrode side to the other electrode side.

It is proposed to use a glass composition as a sealing material (sealing portion) between a single cell and a metal member in a SOFC (International Publication No. WO 2011/105519: PTL 2). The glass composition according to PTL 2 has a composition ratio in terms of oxides, $SiO_2$: 40 to 55 mass %, $Al_2O_3$: 0 to 5.0 mass %, $B_2O_3$: 0 to 8.0 mass %, MgO: 20 to 30 mass %, CaO: 10 to 24 mass %, and the total amount of MgO and CaO: 40 to 54 mass %. Such a composition ratio can provide a glass composition having low reactivity with the constituent materials constituting the SOFC, while having a thermal expansion coefficient suitable for sealing in the SOFC.

SUMMARY

However, the sealing portion of the technique according to PTL 2 has low reactivity with different materials and therefore has a problem in bondability between different materials.

One non-limiting and exemplary embodiment provides a fuel cell including a sealing portion capable of hermetically bonding different materials by an appropriate bonding power while maintaining the respective functions of the different materials to be bonded.

In one general aspect, the techniques disclosed here feature a fuel cell including: a fuel single cell comprising a fuel electrode, an air electrode, and an electrolyte disposed between the electrodes; a separator for separating a fuel gas flowing through the fuel electrode and air flowing through the air electrode; and a sealing portion for hermetically bonding between the separator and the electrolyte, wherein the sealing portion is constituted of a glass composition containing at least two of metallic or metalloid elements contained in the electrolyte and at least two of metallic or metalloid elements contained in the separator; the electrolyte includes a proton conductor; and the proton conductor is represented by a compositional formula: $BaZr_{1-x}M_xO_3$, where $0.05 \leq x \leq 0.5$; and M is at least one selected from the group consisting of Sc, In, Lu, Yb, Tm, Er, Y, Ho, Dy, and/or Gd.

The fuel cell according to an embodiment of the present disclosure is configured as described above and has an advantage that a sealing portion for hermetically bonding different materials to be bonded with appropriate bonding power can be provided while maintaining the respective functions of the both materials.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of Aspect of the Present Disclosure

As the fuel cell stack disclosed in PTL 1, in a configuration in which an electrolyte and a separator are hermetically bonded to prevent leakage of gas from one electrode side to the other electrode side, the present inventors have earnestly studied on a sealing portion for hermetically bonding the electrolyte and the separator.

As such a sealing portion, use of a glass composition is first suggested. The glass composition melts at a temperature higher than the operating temperature of the SOFC by about 100° C. to 150° C. to hermetically bond a ceramic electrolyte and a separator member of a metal such as stainless steel.

Incidentally, when a glass composition is used as a sealing portion, it is necessary to consider not only the differences of the thermal expansion coefficients between the glass composition and the electrolyte and between the glass composition and the separator but also the reactivity. That is, the present inventors have found that even if the thermal expansion coefficients between the electrolyte and the glass composition and between the separator and the glass composition are adjusted, the bonding power is decreased if the reactivity is low. For example, when the glass composition disclosed in PTL 2 is used for bonding between different materials, i.e., between a ceramic electrolyte and a metal separator of a SOFC, the glass composition can be adjusted so as to have a thermal expansion coefficient suitable for bonding between different materials. However, it was found that the glass composition disclosed in PTL 2 has low reactivity with the materials to be bonded and therefore has a problem of bondability between different materials.

In contrast, if the reactivity of the glass composition with materials to be bonded is too high, a part of elements constituting the electrolyte and the separator may be extracted to change the compositions of the electrolyte and the separator. Accordingly, it was perceived that the conductivity of the electrolyte may be decreased or the corrosion resistance of the separator may be decreased. In particular, although the separator has a Cr scattering-preventing function by forming an $Al_2O_3$ film on its surface, if the reactivity between the separator and the glass composition is too high, the $Al_2O_3$ film is partially peeled off, decomposed, and broken. Consequently, the amount of Cr scattering from the separator increases, the air electrode is poisoned by Cr, and the power generation performance of the single cell decreases.

Accordingly, the present inventors have found that it is necessary to appropriately control the reactivity of the glass composition with materials to be bonded, while appropriately adjusting the thermal expansion coefficient. In particular, it was found that in hermetical bonding between the electrolyte and the separator by a glass composition, it is important to maintain the respective functions of the electrolyte and the separator even under circumstances that a part of the elements constituting the electrolyte and the separator is extracted. Specifically, it was found that in order to maintain the respective functions of the electrolyte and the separator, it is necessary to appropriately control the chemical reactivity at the interfaces (interface portions) where the electrolyte and the separator are respectively in contact with the glass composition and to form a configuration allowing self-diffusion of common elements through the interfaces.

The findings by the present inventors described above have not been elucidated, discover new problems, and have novel technical features exhibiting remarkable effects. The present disclosure specifically provides the following aspects.

The fuel cell according to a first aspect of the present disclosure includes: a fuel single cell comprising a fuel electrode, an air electrode, and an electrolyte disposed between the electrodes; a separator for separating a fuel gas flowing through the fuel electrode and air flowing through the air electrode; and a sealing portion for hermetically bonding between the separator and the electrolyte, wherein the sealing portion is constituted of a glass composition containing at least two of metallic or metalloid elements contained in the electrolyte and at least two of metallic or metalloid elements contained in the separator; the electrolyte includes a proton conductor; and the proton conductor is represented by a compositional formula: $BaZr_{1-x}M_xO_3$, where $0.05 \leq x \leq 0.5$; and M is at least one selected from the group consisting of Sc, In, Lu, Yb, Tm, Er, Y, Ho, Dy, and/or Gd.

In the configuration described above, the sealing portion provided to the fuel cell consists of a glass composition containing at least one of metallic or metalloid elements contained in the electrolyte and at least one of metallic or metalloid elements contained in the separator. Consequently, the bonding powers between the sealing portion and the electrolyte and between the sealing portion and the separator can be increased by self-diffusion of elements common therebetween. Furthermore, it is possible to prevent partial decomposition of the electrolyte due to extraction of the metallic or metalloid elements contained in the electrolyte by the sealing portion and thereby to prevent a decrease in the conductivity of the electrolyte. In addition, it is possible to prevent, for example, decomposition and breaking of a film such as the $Al_2O_3$ film formed on the surface of the separator due to extraction of the metallic or metalloid elements contained in the separator by the sealing portion and thereby to prevent a decrease in the corrosion resistance of the separator and to prevent a decrease in the function of suppressing Cr scattering from the separator to the air electrode.

Accordingly, the fuel cell according to the first aspect of the present disclosure has an advantage that a sealing portion for hermetically bonding different materials to be bonded with appropriate bonding power can be provided while maintaining the respective functions of the both materials.

In the fuel cell according to a second aspect of the present disclosure, the separator may contain at least one of Al or Si.

In the fuel cell according to a third aspect of the present disclosure, the separator in the first aspect may be constituted of a metal composition having an $Al_2O_3$ film formed as the surface layer.

In the above-mentioned configuration, since the $Al_2O_3$ film is formed as the surface layer of the separator, the separator can have excellent corrosion resistance. Furthermore, when the metal composition constituting the separator contains Cr, Cr can be prevented from scattering from the separator to the air electrode. Consequently, the single cell can be prevented from decreasing the power generation performance due to poisoning of the air electrode by Cr.

In the fuel cell according to a fourth aspect, the metal composition of the separator in the third aspect may be constituted of ferrite stainless steel containing Al.

In the fuel cell according to a fifth aspect of the present disclosure, the ferrite stainless steel includes a base material, and Al is contained in the base material in a proportion of 0.5 wt % or more and 5 wt % or less with respect to weight of the base material.

In the above-mentioned configuration, since Al is contained in the base material of the ferrite stainless steel in a proportion of 0.5 wt % or more and 5 wt % or less, an $Al_2O_3$ film can be formed as the surface layer of the separator.

Accordingly, the separator can have excellent corrosion resistance. Furthermore, Cr contained in the stainless steel constituting the separator can be prevented from scattering to the air electrode. Consequently, the single cell can be prevented from decreasing the power generation performance due to poisoning of the air electrode by Cr.

In the fuel cell according to a sixth aspect of the present disclosure, the base material further contains Si, and Si is contained in the base material in a proportion of 0.1 wt % or more and a wt % or less with respect to the weight of the base material.

In the above-mentioned configuration, since Si is contained in the base material of the ferrite stainless steel in a proportion of 0.1 wt % or more and 1 wt % or less, the heat resistance of the separator can be increased.

When Si is contained in the base material of the ferrite stainless steel in a proportion of 1 wt % or more, the separator becomes brittle. Accordingly, the proportion of Si contained is preferably 1 wt % or less.

In the fuel cell according to a seventh aspect of the present disclosure, the sealing portion in the sixth aspect may contain Al, Ba, and Si, where the content rates of Al, Ba, and Si are, in terms of oxides, $SiO_2$: 5 wt % or more and 95 wt % or less, $Al_2O_3$: 4.9 wt % or more and 35 wt % or less, and BaO: 0.1 wt % or more and 90 wt % or less.

The sealing portion does not contain an excessive amount of BaO by controlling the contents of Al, Ba, and Si to the above-mentioned proportions in terms of oxides. In other words, the glass composition contains Ba in a proportion such that the Ba is exhausted by generating Ba compounds (excluding $BaCO_3$) in the glass composition constituting the sealing portion. Accordingly, $CO_2$ and BaO contained in the air and the fuel gas, respectively, can be prevented from reacting and generating $BaCO_3$ when the sealing portion are exposed to the air and the fuel gas.

In the fuel cell according to an eighth aspect of the present disclosure, the sealing portion in the seventh aspect includes a first electrolyte-side interface portion, which is a region in the electrolyte-side interface portion of the interface with the electrolyte on the side coming into contact with the air; a first electrolyte-side periphery, which is a predetermined range from the first electrolyte-side interface portion in the thickness direction of the sealing portion; a first separator-side interface portion, which is a region in the separator-side interface portion of the interface with the separator on the side coming into contact with the air; a first separator-side periphery, which is a predetermined range from the first separator-side interface portion in the thickness direction of the sealing portion; a second electrolyte-side interface portion, which is a region in the electrolyte-side interface portion on the side coming into contact with the fuel gas; a second electrolyte-side periphery, which is a predetermined range from the second electrolyte-side interface portion in the thickness direction of the sealing portion; a second separator-side interface portion, which is a region in the separator-side interface portion on the side coming into contact with the fuel gas; and a second separator-side periphery, which is a predetermined range from the second separator-side interface portion in the thickness direction of the sealing portion. Under temperature conditions of 600° C., which is the operating temperature of the fuel cell, the first electrolyte-side interface portion may contain a mixture including $BaAl_2O_4$ and $Ba_2SiO_4$; the first electrolyte-side periphery may contain a mixture including $BaAl_2O_4$ and $Ba_2SiO_4$; the first separator-side interface portion may contain a mixture containing $BaSi_2O_5$ and $Al_2SiO_5$, where the molar fraction of $Al_2SiO_5$ in the mixture is higher than that of $BaSi_2O_5$; the first separator-side periphery may contain a mixture including $BaSi_2O_5$ and $Al_2SiO_5$; the second electrolyte-side interface portion may contain a mixture including $BaAl_2O_4$ and $Ba_2SiO_4$; the second electrolyte-side periphery may contain a mixture including $BaAl_2O_4$ and $Ba_2SiO_4$; the second separator-side interface portion may contain a mixture including $BaAl_2O_4$ and $Ba_2SiO_4$, where the molar fraction of $BaAl_2O_4$ in the mixture is higher than that of $Ba_2SiO_4$; and the second separator-side periphery may contain a mixture including $BaAl_2O_4$ and $Ba_2SiO_4$.

As described above, since oxides are generated in each of the electrolyte-side interface portion and the separator-side interface portion, the bonding powers between the electrolyte and the sealing portion and between the separator and the sealing portion are increased.

In the fuel cell according to a ninth aspect of the present disclosure, the sealing portion in the sixth aspect may contain Al, Ba, Si, and Zr or M.

In the fuel cell according to a tenth aspect of the present disclosure, the content rates of Al, Ba, Si, and Zr or M in the sealing portion in the ninth aspect may be, in terms of oxides, $SiO_2$: 5 wt % or more and 95 wt % or less, $Al_2O_3$: 4.7 wt % or more and 35 wt % or less, BaO: 0.1 wt % or more and 90 wt % or less; and $ZrO_2$: 0.1 wt % or more and 5 wt % or less or oxide of M: 0.1 wt % or more and 5 wt % or less.

The sealing portion will not contain an excessive amount of BaO by controlling the contents of Al, Ba, Si, and Zr to the above-mentioned proportions in terms of oxides or controlling the content of M to the proportion mentioned above. In other words, the glass composition contains Ba in a proportion such that the Ba is exhausted by generating Ba compounds (excluding $BaCO_3$) in the glass composition constituting the sealing portion. Accordingly, $CO_2$ and BaO contained in the air and the fuel gas, respectively, can be prevented from reacting and generating $BaCO_3$ when the sealing portion are exposed to the air and the fuel gas.

In the fuel cell according to an 11th aspect of the present disclosure, the sealing portion in the eighth aspect may be constituted such that the concentrations of Ba contained in the electrolyte-side interface portion and the separator-side interface portion are both higher than the concentration of Ba in the middle region between the electrolyte-side interface portion and the separator-side interface portion.

In the fuel cell according to a 12th aspect of the present disclosure, the sealing portion in the eighth aspect may be formed by stacking a first sealing layer having a surface coming into contact with the air and a second sealing layer having a surface coming into contact with the fuel gas and may be constituted such that the concentration of Ba contained in the first sealing layer is higher than the concentration of Ba contained in the second sealing layer.

Here, in the first layer coming into contact with the air, $BaSi_2O_5$ and $Al_2SiO_5$ are generated in the interface with the separator, and $BaAl_2O_4$ and $Ba_2SiO_4$ are generated in the interface with the electrolyte. Accordingly, Ba is used for generating the respective reaction products.

According to the configuration described above, since the concentration of Ba contained in the first sealing layer is higher than that contained in the second sealing layer, in the generation of the reaction products mentioned above, the amount of Ba extracted from the electrolyte to the first sealing layer can be suppressed.

Thus, since the oxides mentioned above are generated in the first sealing layer at the interface with the electrolyte and at the interface with the separator, the bonding powers between the electrolyte and the sealing portion and between the separator and the sealing portion are increased.

In the fuel cell according to a 13th aspect of the present disclosure, the first sealing layer in the 12th aspect may be composed of a third sealing layer including the first electrolyte-side interface portion and a fourth sealing layer including the first separator-side interface portion stacked in the thickness direction of the sealing portion and the concentration of Ba contained in the third sealing layer may be higher than that contained in the fourth sealing layer.

In the fuel cell according to a 14th aspect of the present disclosure, the second sealing layer in the 13th aspect may contain BaO in a proportion of 0.1 wt %, the third sealing layer may contain BaO in a proportion of 78 wt %, and the fourth sealing layer may contain BaO in a proportion of 30 wt %.

Embodiments of the present disclosure will now be described with reference to the drawings. The following embodiments are merely examples of each of the above-described aspects. Accordingly, for example, the shapes, materials, components, arrangement positions and connection modes of the components shown below do not limit each of the aspects.

In the following description, the same or corresponding component members are denoted by the same reference signs throughout all the drawings, and the description thereof may be omitted. The drawings schematically illustrate the respective components, and the shapes, dimensional ratios, and so on are not precise in some cases.

Embodiment 1

Configuration of Fuel Cell Stack

Figure 1:
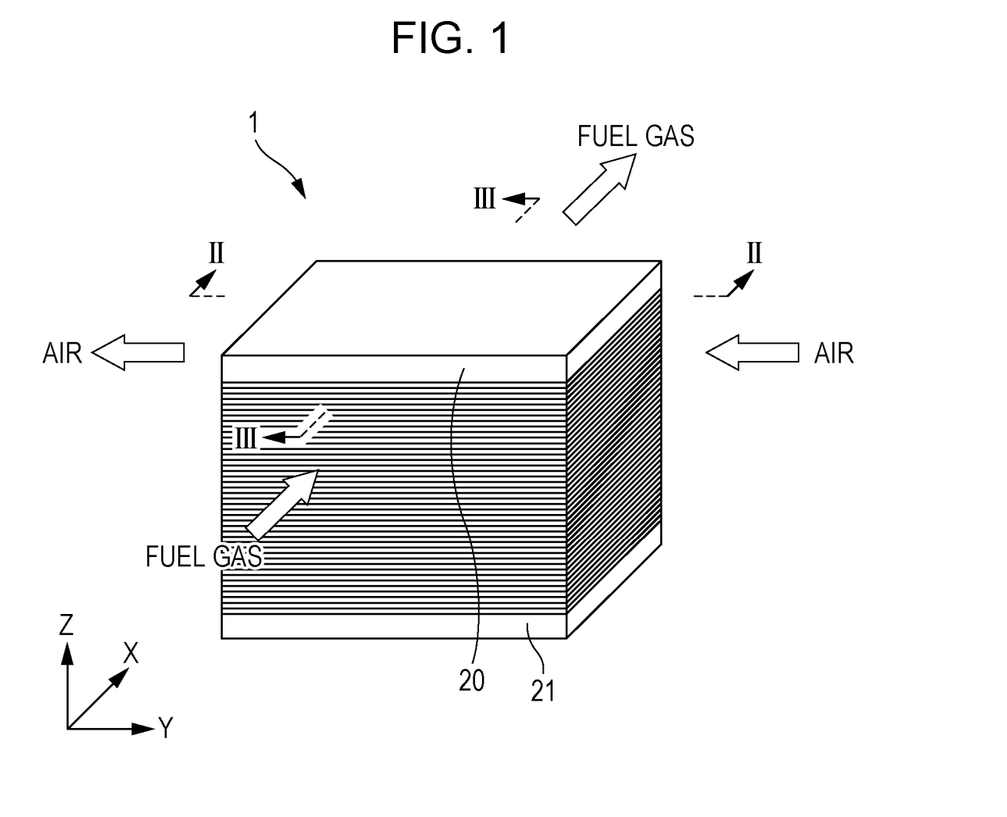
FIG. 1 is a perspective view illustrating an example of a schematic configuration of a fuel cell stack included in a fuel cell according to Embodiment 1 of the present disclosure.
Figure 2:
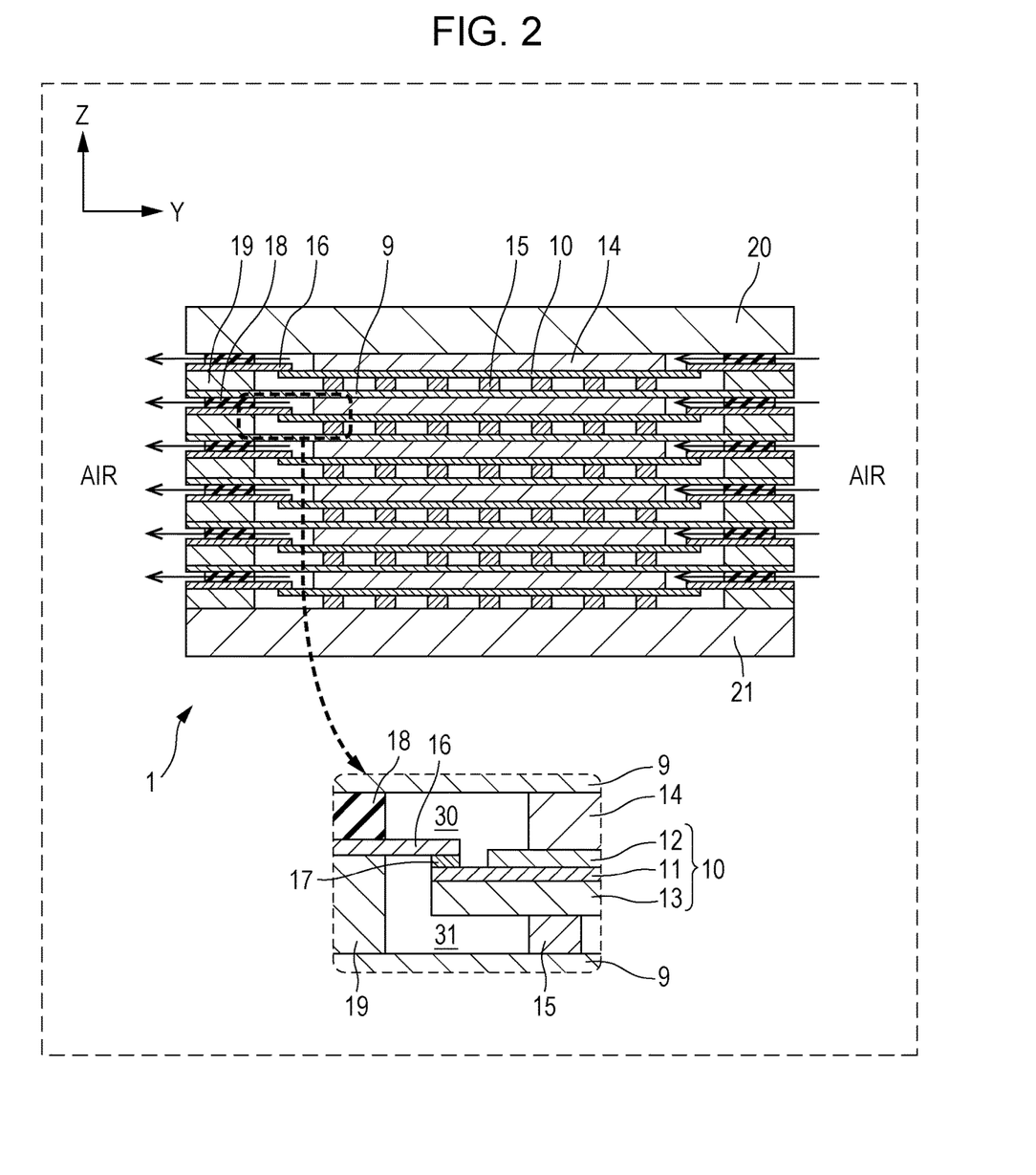
FIG. 2 is a cross-sectional view of the fuel cell stack taken along the line II-II in FIG. 1.
Figure 3:
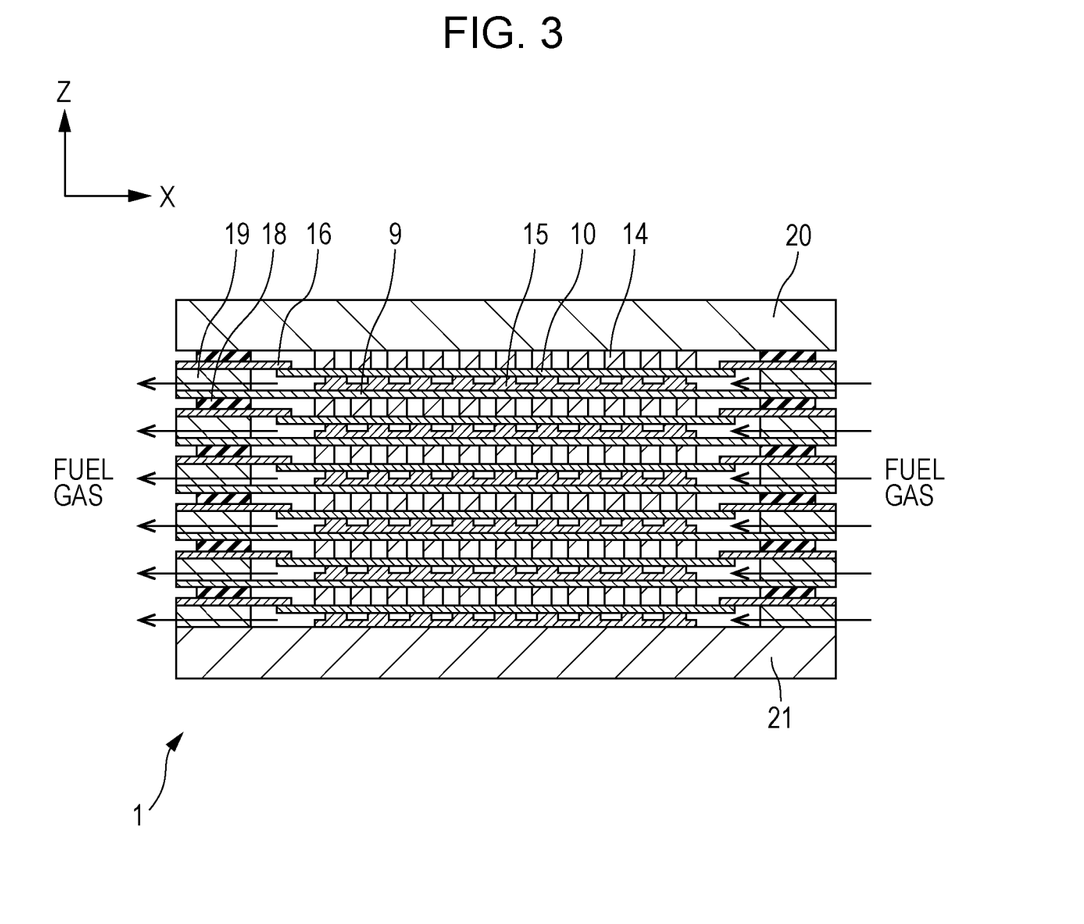
FIG. 3 is a cross-sectional view of the fuel cell stack taken along the line III-III in FIG. 1.

The configuration of a fuel cell stack 1 included in a fuel cell according to Embodiment 1 will be described with reference to FIGS. 1 to 3. FIG. 1 is a perspective view illustrating an example of a schematic configuration of a fuel cell stack 1 included in a fuel cell according to Embodiment 1 of the present disclosure. FIG. 2 is a cross-sectional view of the fuel cell stack 1 taken along the line II-II in FIG. 1. FIG. 3 is a cross-sectional view of the fuel cell stack 1 taken along the line III-III in FIG. 1.

Each drawing show mutually orthogonal XYZ axes for specifying directions. In the present specification, for convenience, the positive direction of the Z axis may be referred to as an upward direction, and the negative direction may be referred to as a downward direction. In the fuel cell stack 1 shown in FIGS. 1 and 2, single cells 10 are stacked in the Z-axis direction, but the stacking direction of the single cells 10 is not necessarily limited to the Z-axis direction. In addition, in the present specification, the fuel cell is described using a solid oxide fuel cell (SOFC) as an example, but is not limited thereto.

As shown in FIGS. 1 to 3, the fuel cell stack 1 is configured such that a first end plate 20 is disposed on an upper base, a second end plate 21 is disposed on a lower base, and a layer including a plurality of single cells 10 stacked vertically (in the Z-axis direction) is sandwiched between the first end plate 20 and the second end plate 21.

The first end plate 20 and the second end plate 21 are rectangular plate-shaped conductive members and can be formed from, for example, stainless steel or stainless steel with a surface coated with a conductive ceramic member (e.g., $(Mn,Co)_3O_4$). A layer including a plurality of single cells 10 is sandwiched by the first end plate 20 and the second end plate 21. The first end plate 20 functions as an output terminal on the plus side of the fuel cell stack 1, and the second end plate 21 functions as an output terminal on the minus side of the fuel cell stack 1.

Although it is not shown in FIGS. 1 to 3, an air inlet (not shown) for supplying air may be provided in a side (first side) of the periphery of the first end plate 20 or the second end plate 21, and an air outlet (not shown) for discharging air may be provided in another side (second side) facing the above-mentioned side (first side). In addition, a fuel gas inlet (not shown) for supplying a fuel gas may be provided in a side (third side) orthogonal to the first side in which the air inlet is provided, and a fuel gas outlet (not shown) for discharging the fuel gas may be provided in another side (fourth side) facing the above-mentioned side (third side).

Examples of the fuel gas are those of 300° C. to 700° C. and include hydrogen and reformed gases obtained by reforming hydrocarbon fuel gases such as town gas or LPG.

As shown in FIG. 2, the air supplied through the air inlet (not shown) passes through the circumference of the single cell 10 on the air electrode 12 side (the side on which the air electrode-side current collector 14 is provided) and is discharged through the air outlet (not shown).

As shown in FIG. 3, the fuel gas supplied through the fuel gas inlet (not shown) passes through the circumference of the single cell 10 on the fuel electrode 13 side (the side on which the fuel electrode-side current collector 15 is provided) and is discharged through the fuel gas outlet (not shown).

As described above, in the fuel cell stack 1 according to Embodiment 1 of the present disclosure, the air and the fuel gas flow such that their flow directions substantially cross each other in the X-Y plane.

Configuration of Single Cell

The configuration of the single cell 10 included in the fuel cell stock of the fuel cell will now be described with reference to FIG. 2.

As shown in FIG. 2, the fuel single cell 10 includes an electrolyte 11, and an air electrode 12 and a fuel electrode 13 arranged so as to face each other in the vertical direction (the stacking direction of the single cell 10) with the electrolyte 11 therebetween. As shown in FIG. 2, the fuel single cell 10 according to Embodiment 1 of the present disclosure is a fuel electrode-supporting single cell in which the fuel electrode 13 supports the electrolyte 11 and the air electrode 12, but is not limited thereto and may be an air electrode-supporting single cell in which the air electrode 12 supports the electrolyte 11 and the fuel electrode 13. Alternatively, the single cell 10 may be an electrolyte-supporting single cell in which the electrolyte 11 supports the fuel electrode 13 and the air electrode 12.

As shown in FIG. 2, the single cell 10 is provided with a separator 16 for separating the air to be supplied to the air electrode 12 and the fuel gas to be supplied to the fuel electrode 13.

The electrolyte 11 is a rectangular plate-shaped dense product and may be constituted of an yttria-stabilized zirconia (YSZ), lanthanum-gallate (La is partially substituted with Sr, and Ga is partially substituted with Mg), or ceria (Ce is partially substituted with Gd) oxide ion conductor or may be constituted of a proton conductor. The electrolyte 11 desirably has a high ion conductivity (for example, an ion conductivity higher than 0.001 S/cm, preferably 0.01 S/cm or more) and a low electron conductivity (for example, an electron conductivity lower than the ion conductivity of the electrolyte by one or more orders of magnitude, preferably two or more orders of magnitude).

The proton conductor may be represented by, for example, a compositional formula: $BaZr_{1-x}M_xO_3$ ($0.05 \leq x \leq 0.5$; M=Sc, In, Lu, Yb, Tm, Er, Y, Ho, Dy, and/or Gd). Desirably, the proton conductor may be Yb-doped barium zirconate (BZYb). The thickness of the electrolyte 11 is in a range of 1 μm or more and 50 μm or less. A smaller thickness of the electrolyte 11 is preferred from the viewpoint of power generation performance, but a larger thickness is preferred from the viewpoint of strength. Accordingly, the thickness of the electrolyte 11 is more preferably within an intermediate range between the both, 5 μm or more and 30 μm or less.

The fuel electrode 13 is preferably of a mixed conductor of electron and proton and is preferably constituted of a material having a composition stable for reducing gases such as hydrogen or reformed gas. For example, the fuel electrode 13 can be constituted of a mixture of nickel (Ni) and $BaZr_{1-x}M_xO_3$ ($0.05 \leq x \leq 0.5$; M=Sc, In, Lu, Yb, Tm, Er, Y, Ho, Dy, and/or Gd). In such a case, the weight ratio between nickel (Ni) and $BaZr_{1-x}M_xO_3$ can be, for example, 60:40. The fuel electrode 13 is not limited to this composition. The fuel electrode 13 as a support preferably has a thickness of 100 μm or more and 2 mm or less.

The air electrode 12 is preferably of a mixed conductor of electron and proton, and examples thereof include LSC: $La_{1-x}Sr_xCoO_3$ ($0.05 \leq x \leq 0.5$), and LSCF: $La_{1-x}Sr_xCo_{1-y}Fe_yFeO_3$ ($0.05 \leq x \leq 0.5$, $0.05 \leq y \leq 0.95$). The thickness of the air electrode 12 is 1 μm or more from the viewpoint of mixed conductivity of ion and electron and diffusivity of oxygen and is preferably 100 μm or less.

The separator 16 is a frame-shaped member having a rectangular hole at the center and is constituted of a metal composition forming an $Al_2O_3$ film as the surface layer. Examples of the metal composition include ferrite stainless steel containing Al. As shown in FIG. 2, the inner peripheral portion (rim portion) of the frame-shaped separator 16 is disposed so as to face the periphery surface of the electrolyte 11 on the side where the air electrode 12 is disposed. The separator 16 is connected to the facing periphery of the electrolyte 11 via the sealing portion 17. In the fuel cell stack 1, by the separator 16, an air distribution region 30 that faces the air electrode 12 and through which air flows and a fuel gas distribution region 31 that faces the fuel electrode 13 and through which a fuel gas flows are divided. Thus, the fuel cell stack 1 includes the separator 16 and thereby can prevent gas leakage from one electrode side to the other electrode side. The details of the separator 16 will be described in detail later.

An air electrode-side current collector 14 is provided on the outer side of the air electrode 12 of the single cell 10, and a fuel electrode-side current collector 15 is provided on the outer side of the fuel electrode 13. The single cell 10, the air electrode-side current collector 14, and the fuel electrode-side current collector 15 are sandwiched vertically between a pair of interconnectors 9. Alternatively, a single interconnector 9 may be provided on the side of the air electrode-side current collector 14 or the fuel electrode-side current collector 15.

The interconnector 9 is a rectangular plate-shaped conductive member and can be made of, for example, ferrite stainless steel. The interconnector 9 secures electrical continuity between stacked single cells 10, and prevents reactant gases from being mixed between the single cells 10. As shown in FIG. 2, a single interconnector 9 is disposed between adjacent single cells 10, and adjacent single cells 10 share a single interconnector 9.

An air electrode-side frame 18 is a frame-shaped member having a rectangular hole at the center and is made of, for example, an insulator such as mica, thermiculite, or vermiculte. The hole formed at the center of the air electrode-side frame 18 can form the air distribution region 30 facing the air electrode 12. The air electrode-side frame 18 is in contact with the separator 16 and the interconnector 9 in a state that compressive force is applied in the vertical direction (the z-axis direction) to seal the air distribution region 30 such that the flowing air does not leak to the outside of the fuel cell stack 1.

A fuel electrode-side frame 19 is a frame-shaped member having a rectangular hole at the center and is made of a metal. The hole formed at the center of the fuel electrode-side frame 19 can form the fuel gas distribution region 31 facing the fuel electrode 13. The fuel electrode-side frame 19 is in contact with the separator 16 and the interconnector 9 in a state that compressive force is applied in the vertical direction (the z-axis direction) to seal the fuel gas distribution region 31 such that the flowing fuel gas does not leak to the outside of the fuel cell stack 1.

Configuration of Separator

Figure 4:
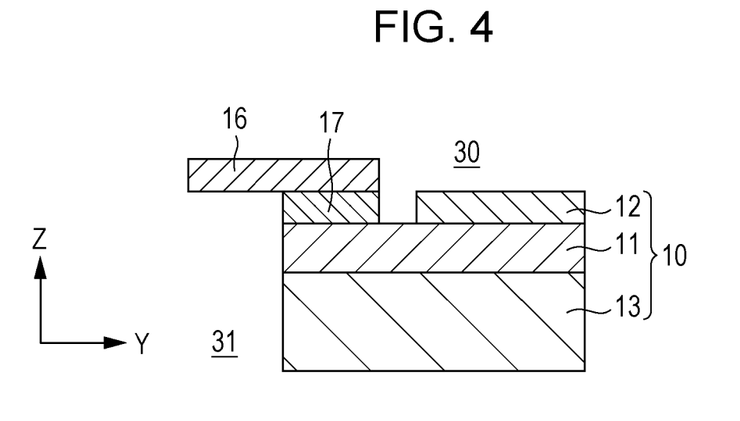
FIG. 4 is a diagram schematically illustrating an example of the configuration of the single cell, separator, and sealing portion shown in FIG. 2.

The configuration of the separator will be described in detail with reference to FIGS. 2 and 4. FIG. 4 is a diagram schematically illustrating an example of the configuration of the single cell 10, the separator 16, and the sealing portion 17 shown in FIG. 2.

As shown in FIGS. 2 and 4, the separator 16 has a function of dividing air (air distribution region 30) and a fuel gas (fuel gas distribution region 31). Furthermore, the separator 16 is connected to the electrolyte 11 of the single cell 10 via the sealing portion 17 and has a function of absorbing the influence of expansion and contraction of the single cell 10 occurring, for example, at the time of starting or stopping the fuel cell. The separator 16, as described above, is made of a metal composition forming an $Al_2O_3$ film as the surface layer. The thickness of the $Al_2O_3$ film formed as the surface layer is 0.1 μm or more, preferably within a range of 1 μm to 100 μm. The metal composition forming the separator 16 is, for example, stainless steel and preferably Al-containing ferrite stainless steel having a linear expansion coefficient similar to that of the single cell 10 (e.g., 8 to 13 ppm/K). Examples of the metal composition forming the separator 16 include NCA-1 manufactured by Nisshin Steel Co., Ltd. and NSSC (registered trademark) 21MK manufactured by Nippon Steel & Sumitomo Metal Corporation. Such ferrite stainless steel contains, for example, Si, Mn, and Ti, in addition to Fe, Cr, and Al, and incorporates oxygen to form an $Al_2O_3$ film or a $Cr_2O_3$ film as the surface layer. The separator 16 formed from such ferrite stainless steel may be heated to 500° C. or more in advance before the bonding with the sealing portion 17 for forming an $Al_2O_3$ film as the surface layer. Desirably, when a metal composition having an $Al_2O_3$ film formed as the surface layer is used as the separator 16, before the step of bonding (fusing) the separator 16 and the electrolyte 11 via the sealing portion 17, a step of heating the metal composition of the separator 16 at 800° C. in air for 3 hours and generating an $Al_2O_3$ film as the surface layer may be carried out.

When the separator 16 is formed from ferrite stainless steel mentioned above, the base material of the ferrite stainless steel may contain Al within a range of 0.5 wt % or more and 5 wt % or less. That is, in order to form an $Al_2O_3$ film as the surface layer of the separator 16, it is necessary that the content of Al in the base material of the ferrite stainless steel is 0.5 wt % or more. In addition, in order to favorably perform a welding process, it is necessary that the content of Al in the base material of the ferrite stainless steel is 5 wt % or less, more preferably 3 wt % or less. The base material of the ferrite stainless steel may further contain Si within a range of 0.1 wt % or more and 1 wt % or less.

The thickness of the separator 16 is desirably within a range of 0.05 mm or more and 0.5 mm or less. This is for maintaining the elastic function for mitigating the influence of the expansion and contraction of the single cell 10 in the temperature range of 500° C. to 700° C., which is the operating temperature of the fuel cell during power generation.

When the average operating temperature of the fuel cell stack 1 is about 600° C. (highest operating temperature: about 650° C.), the separator 16 and the electrolyte 11 may be bonded (fused) via the sealing portion 17 within a temperature range of 700° C. to 850° C., preferably 800° C. to 850° C., in air.

Configuration of Sealing Portion

The configuration of the sealing portion 17 will now be described in detail with reference to FIGS. 2 and 4. The sealing portion 17 is a member for hermetically bonding the separator 16 and the electrolyte 11 and is mainly constituted of a glass composition containing ceramics. The sealing portion 17 has a function of bonding the separator 16 and the electrolyte 11 and also a function of sealing between the both to separate air and the fuel gas. As shown in FIGS. 2 and 4, the sealing portion 17 is disposed between the frame-shaped separator 16 and the electrolyte 11 to hermetically bond the both at the region in the inner peripheral portion of the frame-shaped separator 16 and facing the electrolyte 11 and the region of the periphery of the electrolyte 11 and facing the separator 16.

The sealing portion 17 is constituted such that the chemical reactivity at the interfaces where the electrolyte 11 and the separator 16 are respectively in contact with the sealing portion 17 is appropriately adjusted and self-diffusion of common elements through the interfaces is caused. Specifically, the sealing portion 17 is constituted of a glass composition containing at least one of the metallic or metalloid elements contained in the electrolyte 11 and at least one of the metallic or metalloid elements contained in the separator 16. For example, when the electrolyte 11 is constituted of a proton conductor represented by a compositional formula: $BaZr_{1-x}M_xO_3$ (M=Sc, In, Lu, Yb, Tm, Er, Y, Ho, Dy, and/or Gd) and the separator 16 is constituted of ferrite stainless steel containing Al in the base material, the sealing portion 17 is constituted of a glass composition containing Al contained in the separator 16 and at least one of Ba, Zr, and M contained in the electrolyte 11. For example, the sealing portion 17 can be constituted of a glass composition mainly composed of BaO, $Al_2O_3$, and $SiO_2$ and can have a thickness of 10 μm to 0.5 mm. Here, the thickness of the sealing portion 17 is the distance between the separator 16 and the electrolyte 11, and the thickness direction of the sealing portion 17 is defined as the stacking direction of the single cell 10 (the Z-axis direction in FIG. 2). Examples of the metallic element contained in the sealing portion 17 described above include Al, Ba, Zr, and M (Sc, In, Lu, Yb, Tm, Er, Y, Ho, Dy, and/or Gd). Examples of the metalloid element contained in the sealing portion 17 include boron (B) and silicon (Si).

As described above, the sealing portion 17 contains at least one of the metallic or metalloid elements contained in the electrolyte 11 and at least one of the metallic or metalloid elements contained in the separator 16. Accordingly, the bonding power between the sealing portion 17 and the electrolyte 11 and the bonding power between the sealing portion 17 and the separator 16 can be enhanced by self-diffusion of common elements. Furthermore, the function of the electrolyte 11 can be prevented from being impaired due to extraction of a large amount of a metallic or metalloid element contained in the electrolyte 11 by the sealing portion 17. Similarly, the function of the separator 16 can be prevented from being impaired due to extraction of a large amount of a metallic or metalloid element contained in the separator 16 by the sealing portion 17.

An example of the combination of the sealing portion 17, the separator 16, and the electrolyte 11 in the above-described configuration is as follows. That is, the separator 16 is of Al-containing ferrite stainless steel having a surface layer of $Al_2O_3$, the sealing portion 17 is of a glass composition containing BaO and $Al_2O_3$ (BaO—$Al_2O_3$-containing glass composition), and the electrolyte 11 is of Yb-doped barium zirconate (BZYb). The sealing portion 17 can have a thickness of 10 μm to 2 mm.

The metallic element contained in the electrolyte 11 is not limited to the above-mentioned examples, and the electrolyte 11 may contain at least one metallic element selected from the group consisting of Ba, Zr, Ce, La, Sr, Ga, Mg, Y, Sc, and Gd, and the separator 16 may contain Al or Si.

Furthermore, the sealing portion 17 may be constituted of a glass composition containing at least two of the metallic or metalloid elements contained in the electrolyte 11 and at least two of the metallic or metalloid elements contained in the separator 16. For example, when the electrolyte 11 is constituted of a proton conductor represented by a compositional formula: $BaZr_{1-x}M_xO_3$ (M=Sc, In, Lu, Yb, Tm, Er, Y, Ho, Dy, and/or Gd) and the separator 16 is constituted of ferrite stainless steel containing Al and Si in the base material, the sealing portion 17 may be constituted of a glass composition containing Al and Si contained in the separator 16 and at least two of Ba, Zr, and M contained in the electrolyte 11. For example, when M of the electrolyte 11 (proton conductor) is Yb, the sealing portion 17 contains Al, Ba, Si, and Zr or Yb. As the number of the types of metallic or metalloid elements common between the sealing portion 17 and the electrolyte 11 and between the sealing portion 17 and the separator 16 increases, the number of the types of self-diffusion common elements between them increases to further enhance the bondability.

An example of the combination of the separator 16, the electrolyte 11, and the sealing portion 17 containing at least two metallic or metalloid elements common to the separator 16 and the electrolyte 11, respectively, as described above is as follows. That is, the separator 16 is of ferrite stainless steel containing Al and Si and having $Al_2O_3$ as the surface layer, the sealing portion 17 is of a glass composition containing BaO, $Al_2O_3$, and $SiO_2$ (BaO—$Al_2O_3$—$SiO_2$-containing glass composition), and the electrolyte 11 may contain a proton conductor represented by a compositional formula: $BaZr_{1-x}M_xO_3$ ($0.05 \leq x \leq 0.5$; M=Sc, In, Lu, Yb, Tm, Er, Y, Ho, Dy, and/or Gd), desirably, Yb-doped barium zirconate (BZYb). In particular, the sealing portion 17 contains Al, Ba, and Si as described above, and the contents of Al, Ba, and Si are, in terms of oxides, $SiO_2$: 5 wt % or more and 95 wt % or less, $Al_2O_3$: 4.9 wt % or more and 35 wt % or less, and BaO: 0.1 wt % or more and 90 wt % or less.

Furthermore, the sealing portion 17 may contain, in addition to Al, Ba, and Si mentioned above, Zr or M (M contains at least one element selected from the group consisting of Sc, In, Lu, Yb, Tm, Er, Y, Ho, Dy, and Gd), and the sealing portion 17 may preferably contain Yb, in addition to Al, Ba, and Si mentioned above. In such a case, the contents of Al, Ba, Si, and Zr or M in the sealing portion 17 are, in terms of oxides, $SiO_2$: 5 wt % or more or more and 95 wt % or less, $Al_2O_3$: 4.7 wt % or more and 35 wt % or less, BaO: 0.1 wt % or more and 90 wt % or less, and $ZrO_2$: 0.1 wt % or more and 5 wt % or less or oxide of M: 0.1 wt % or more and 5 wt % or less. M is preferably Yb. The sealing portion 17 can have a thickness of 10 μm to 2 mm.

The bondability of the sealing portion 17 to the separator 16 and the electrolyte 11 should be controlled such that the $Al_2O_3$ film is not destroyed by extraction of a large amount of Al from the separator 16 and that large amounts of Ba, etc. are not extracted from the electrolyte 11, in order to maintain the function of the $Al_2O_3$ film formed as the surface layer of the separator 16 and the performance of the electrolyte 11. That is, it is important that the sealing portion 17 has bonding power such that the amount of Al extracted from the separator 16 is within a range that does not destroy the $Al_2O_3$ film and that the amount of Ba extracted from the electrolyte 11 is within a range that can maintain the performance of the electrolyte 11.

When the electrolyte 11 is constituted of BZYb, Ba affecting the performance of the electrolyte 11 is not present on the main surface of the electrolyte 11 on the air electrode 12 side. Accordingly, the sealing portion 17 is disposed on the periphery of the electrolyte 11 within a region facing the separator 16 (the main surface on the air electrode 12 side), and reacts with Ba not directly affecting the performance of the electrolyte 11 to be bonded. Alternatively, the sealing portion 17 preferably can extract Ba within a slight amount that does not affect the performance of the electrolyte 11 from the inside of the electrolyte 11. In such bonding, when the sealing portion 17 extracts a slight amount of Ba from the inside of the electrolyte 11, it is possible to suppress generation of $BaCO_3$ inside the electrolyte 11. Generation of $BaCO_3$ inside the electrolyte 11 causes, for example, breaking or cracking of the electrolyte 11 to reduce the reliability. Accordingly, a constitution that suppresses the generation of $BaCO_3$ is advantageous.

Modification 1

Figure 5:
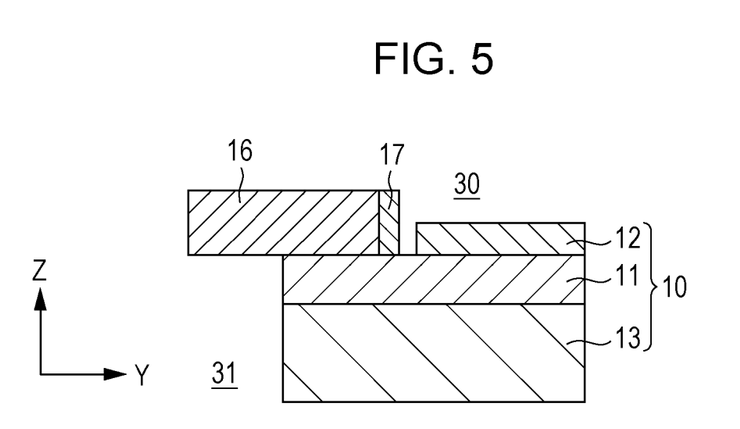
FIG. 5 is a diagram schematically illustrating an example of the configuration of the single cell, separator, and sealing portion according to Modification 1 of Embodiment 1 of the present disclosure.

The sealing portion 17 according to Embodiment 1 of the present disclosure has, as shown in FIG. 4, a predetermined thickness and connects the main surfaces of the separator 16 and the electrolyte 11 facing each other. However, the bonding position of the sealing portion 17 is not limited to this position. For example, as shown in FIG. 5, the sealing portion 17 may connect an end of the inner peripheral portion of the frame-shaped separator 16 and the main surface of the electrolyte 11 on the air electrode 12 side in a state that the separator 16 and the electrolyte 11 are in contact with each other. FIG. 5 is a diagram schematically illustrating an example of the configuration of the single cell 10, the separator 16, and the sealing portion 17 according to Modification 1 of Embodiment 1 of the present disclosure.

Modification 2

Figure 6:
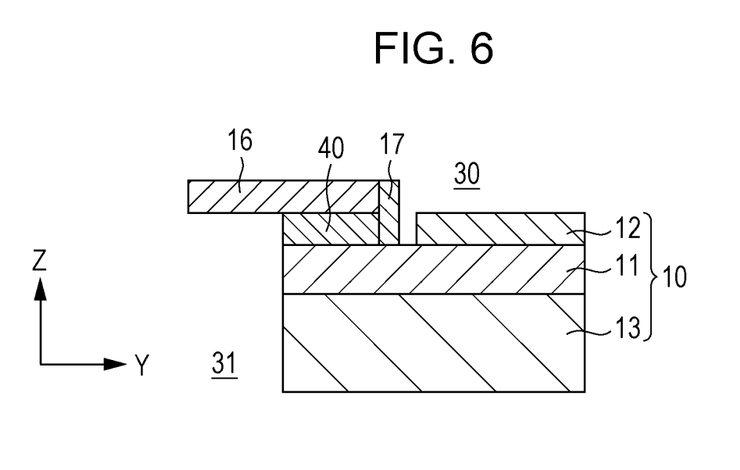
FIG. 6 is a diagram schematically illustrating an example of the configuration of the single cell, separator, and sealing portion according to Modification 2 of Embodiment 1 of the present disclosure.

As shown in FIG. 6, an intermediate material 40 may fill between the separator 16 and the electrolyte 11 without connecting the separator 16 and the electrolyte 11 by direct contact as in Modification 1 shown in FIG. 5, and the separator 16 and the electrolyte 11 may be connected via the sealing portion 17. FIG. 6 is a diagram schematically illustrating an example of the configuration of the single cell 10, the separator 16, and the sealing portion 17 according to Modification 2 of Embodiment 1 of the present disclosure.

As the intermediate material 40, Ag wax or Ni wax can be used. In Modification 2, since the intermediate material 40 is provided, even when the separator 16 and the electrolyte 11 cannot be connected by direct contact unlike Modification 1 shown in FIG. 5, the separator 16 and the electrolyte 11 can be connected to each other.

Modification 3

Figure 7:
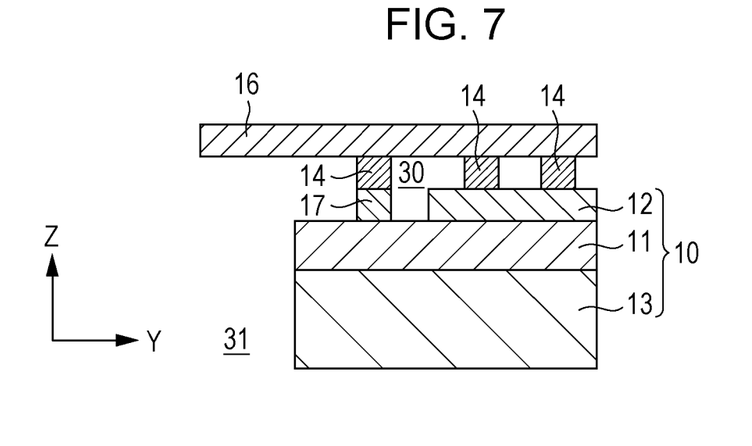
FIG. 7 is a diagram schematically illustrating an example of the configuration of the single cell, separator, and sealing portion according to Modification 3 of Embodiment 1 of the present disclosure.

In the fuel cell stack 1 according to Embodiment 1 of the present disclosure, the separator 16 and the interconnector 9 are separately provided, but the configuration is not limited thereto. For example, as shown in FIG. 7, the separator 16 may also function as an interconnector, and a part of the air electrode-side current collectors 14 provided to the separator 16 may be connected to the electrolyte 11 via the sealing portion 17. FIG. 7 is a diagram schematically illustrating an example of the configuration of the single cell 10, the separator 16, and the sealing portion 17 according to Modification 3 of Embodiment 1 of the present disclosure.

Reaction Product Generated in Sealing Portion

Figure 8:
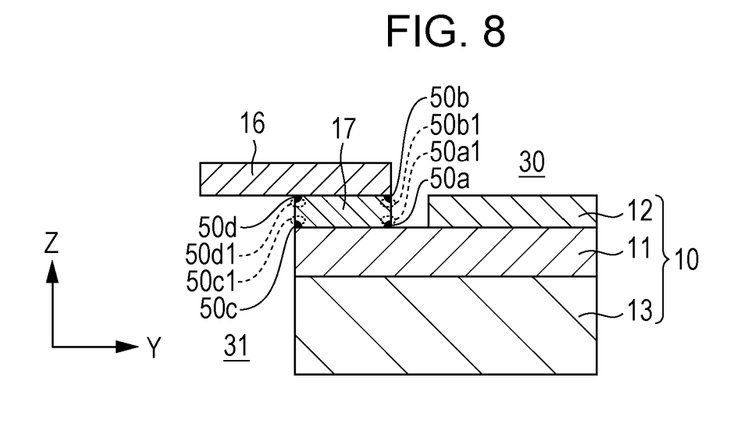
FIG. 8 is a diagram schematically illustrating the configuration of the single cell, separator, and sealing portion shown in FIG. 2 and the positions where reaction products are generated.

The reaction product generated in the sealing portion 17 will now be described using an example of the configuration of the single cell 10, to which the separator 16 is bonded as shown in FIG. 4, according to Embodiment 1 of the present disclosure. In particular, reaction products generated in the regions at eight positions shown in FIG. 8 will be described. The eight positions are as follows: In the interface portion between the sealing portion 17 and the electrolyte 11 (electrolyte-side interface portion), a region coming into contact with air, the periphery of the region, a region coming into contact with the fuel gas, and the periphery of the region; and in the interface portion between the sealing portion 17 and the separator 16 (separator-side interface portion), a region coming into contact with air, the periphery of the region, a region coming into contact with the fuel gas, and the periphery of the region. FIG. 8 is a diagram schematically illustrating the configuration of the single cell 10, the separator 16, and the sealing portion 17 shown in FIG. 2 and the positions where reaction products are generated. The reaction products investigated are those generated under temperature conditions of 600° C., which is the operating temperature of the fuel cell.

Specifically, the first region in the sealing portion 17 is a first electrolyte-side interface portion 50a which is a region in the electrolyte-side interface portion on the side coming into contact with the air flowing in the air distribution region 30. The second region is a first electrolyte-side periphery 50a1 which is a predetermined range from the first electrolyte-side interface portion 50a in the thickness direction of the sealing portion 17 (for example, a range of 0.1 to 2000 μm from the first electrolyte-side interface portion 50a in the thickness direction of the sealing portion 17). The third region is a first separator-side interface portion 50b which is a region in the separator-side interface portion on the side coming into contact with the air flowing in the air distribution region 30. The fourth region is a first separator-side periphery 50b1 which is a predetermined range from the first separator-side interface portion 50b in the thickness direction of the sealing portion 17 (for example, a range of 0.1 to 2000 μm from the first separator-side interface portion 50b in the thickness direction of the sealing portion 17). The fifth region is a second electrolyte-side interface portion 50c which is a region in the electrolyte-side interface portion on the side coming into contact with the fuel gas flowing in the fuel gas distribution region 31. The sixth region is a second electrolyte-side periphery 50c1 which is a predetermined range from the second electrolyte-side interface portion 50c in the thickness direction of the sealing portion 17 (for example, a range of 0.1 to 2000 µm from the second electrolyte-side interface portion 50c in the thickness direction of the sealing portion 17). The seventh region is a second separator-side interface portion 50d which is a region in the separator-side interface portion on the side coming into contact with the fuel gas flowing in the distribution region 31. The eighth region is a second separator-side periphery 50d1 which is a predetermined range from the second separator-side interface portion 50d in the thickness direction of the sealing portion 17 (for example, a range of 0.1 to 2000 µm from the second separator-side interface portion 50d in the thickness direction of the sealing portion 17).

In the first electrolyte-side interface portion 50a, Al and Ba contained in the sealing portion 17 and Ba contained in the electrolyte 11 (near the interface portion of the electrolyte 11) react to generate $BaAl_2O_4$. Furthermore, in the first electrolyte-side interface portion 50a, Si and Ba contained in the sealing portion 17 and Ba contained in the electrolyte 11 (near the interface portion of the electrolyte 11) react to generate $Ba_2SiO_4$. This is because the state existing in these oxides is thermodynamically stable. Accordingly, the first electrolyte-side interface portion 50a contains a mixture including $BaAl_2O_4$ and $Ba_2SiO_4$.

In also the first electrolyte-side periphery 50a1, as in the first electrolyte-side interface portion 50a, $BaAl_2O_4$ and $Ba_2SiO_4$ are generated. Accordingly, the first electrolyte-side periphery 50a1 contains a mixture including $BaAl_2O_4$ and $Ba_2SiO_4$.

It is conceived that Ba contained in the sealing portion 17 is preferentially used for the reaction and a deficit in Ba is extracted from the electrolyte 11. Thus, since the sealing portion 17 generates $BaAl_2O_4$ and $Ba_2SiO_4$ in the interface with the electrolyte 11 and the periphery thereof on the air distribution region 30 side, the bondability with the electrolyte 11 can be enhanced. Furthermore, the electrolyte 11 is readily stabilized chemically and in performance when the molar amount of Ba is smaller than the total molar amount of Zr and M, desirably, and Yb. Accordingly, high performance and reliability can be achieved by partially extracting Ba from the electrolyte 11 at the time of bonding the electrolyte 11 and the sealing portion 17.

In the first separator-side interface portion 50b, Al contained in the separator 16 and Ba, Al, and Si contained in the sealing portion 17 react to generate $BaSi_2O_5$ and $Al_2SiO_5$. Accordingly, the first separator-side interface portion 50b contains a mixture including $BaSi_2O_5$ and $Al_2SiO_5$. However, in this mixture, the molar fraction of $Al_2SiO_5$ is higher than the molar fraction of $BaSi_2O_5$ ($Al_2SiO_5$-rich). Al contained in both the first separator-side periphery 50b1 and the separator 16 and Ba, Al, and Si contained in the sealing portion 17 react to generate $BaSi_2O_5$ and $Al_2SiO_5$. Accordingly, the first separator-side periphery 50b1 contains a mixture including $BaSi_2O_5$ and $Al_2SiO_5$. Thus, since the sealing portion 17 generates $BaSi_2O_5$ and $Al_2SiO_5$ in the interface with the separator 16 and the periphery thereof on the air distribution region 30 side, the bondability with the separator 16 can be enhanced.

In the second electrolyte-side interface portion 50c, as in the first electrolyte-side interface portion 50a, $BaAl_2O_4$ and $Ba_2SiO_4$ are generated, and in the second electrolyte-side periphery 50c1, as in the first electrolyte-side periphery 50a1, $BaAl_2O_4$ and $Ba_2SiO_4$ are generated. Accordingly, the second electrolyte-side interface portion 50c contains a mixture including $BaAl_2O_4$ and $Ba_2SiO_4$, and the second electrolyte-side periphery 50c1 contains a mixture including $BaAl_2O_4$ and $Ba_2SiO_4$.

$BaCO_3$ is readily generated in the second electrolyte-side interface portion 50c and the second electrolyte-side periphery 50c1 under temperature conditions of lower than 550° C., for example, 500° C. If $BaCO_3$ is generated in the electrolyte-side interface portion and periphery thereof, at the time of the generation, the sealing portion 17 extracts a large amount of Ba from the electrolyte 11 to partially decompose the electrolyte 11, and the conductivity of the electrolyte 11 may be decreased. Thus, since the generation of $BaCO_3$ may destabilize the power generation performance of the single cell 10, the operating temperature of the fuel cell according to the embodiment is preferably 550° C. or more, in particular, about 600° C. (600° C.±30° C.).

As described above, since the sealing portion 17 generates $BaAl_2O_4$ and $Ba_2SiO_4$ in the interface with the electrolyte 11 and the periphery thereof on the fuel gas distribution region 31 side, the bondability with the electrolyte 11 can be enhanced.

In the second separator-side interface portion 50d, $BaAl_2O_4$ and $Ba_2SiO_4$ are generated. Accordingly, the second separator-side interface portion 50d contains a mixture including $BaAl_2O_4$ and $Ba_2SiO_4$. In this mixture, the molar fraction of $BaAl_2O_4$ is higher than the molar fraction of $BaSiO_4$ ($BaAl_2O_4$-rich). In the second separator-side periphery 50d1, $BaAl_2O_4$ and $Ba_2SiO_4$ are generated. Accordingly, the second separator-side periphery 50d1 contains a mixture including $BaAl_2O_4$ and $Ba_2SiO_4$.

$BaCO_3$ is readily generated in the second separator-side interface portion 50d and the second separator-side periphery 50d1 under temperature conditions of lower than 550° C., for example, 500° C. If $BaCO_3$ is generated in the second separator-side interface portion 50d and the second separator-side periphery 50d1, $BaCO_3$ is decomposed into BaO and $CO_2$ at the time of starting or stopping the fuel cell, resulting in mechanical brittleness. Accordingly, the operating temperature of the fuel cell is preferably 550° C. or more, and preferably about 600° C. (i.e., 600° C.±30° C.).

As described above, since the sealing portion 17 generates $BaAl_2O_4$ and $Ba_2SiO_4$ in the interface with the separator 16 and periphery thereof on the fuel gas distribution region 31 side, the bondability with the separator 16 can be enhanced.

In addition, as described above, in the sealing portion 17, reaction products containing Ba are generated in each of the first electrolyte-side interface portion 50a, the second electrolyte-side interface portion 50c, the first separator-side interface portion 50b, and the second separator-side interface portion 50d. In contrast, in the middle region between the electrolyte-side interface portion and the separator-side interface portion of the sealing portion 17, Ba is partially extracted at the time of the generation of a reaction product containing Ba. Accordingly, in the sealing portion 17, the concentrations of Ba in the electrolyte-side interface portion and the separator-side interface portion are higher than that in the middle region between the electrolyte-side interface portion and the separator-side interface portion.

Embodiment 2

Figure 9:
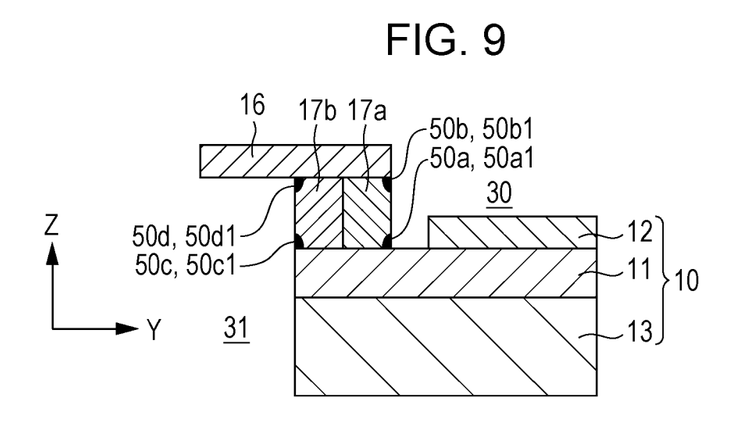
FIG. 9 is a diagram schematically illustrating an example of the configuration of the single cell, separator, and sealing portion according to Embodiment 2 of the present disclosure.

The configuration of a single cell 10, a separator 16, and a sealing portion 17 provided to a fuel cell stack 1 of a fuel cell according to Embodiment 2 of the present disclosure will now be described. In the fuel cell according to Embodiment 2 of the present disclosure, the same members as those of the fuel cell according to Embodiment 1 of the present disclosure are denoted by the same reference signs, and a detailed description thereof will be omitted.

The configuration of a fuel cell stack 1 of a fuel cell according to Embodiment 2 will now be described with reference to FIG. 9. FIG. 9 is a diagram schematically illustrating an example of the configuration of the single cell 10, the separator 16, and the sealing portion 17 according to Embodiment 2 of the present disclosure. As shown in FIG. 9, the fuel cell stack 1 according to Embodiment 2 is the same as the fuel cell stack 1 according to Embodiment 1 except that the sealing portion 17 is composed of two layers (first sealing layer 17 and second sealing layer 17b).

That is, the sealing portion 17 is formed by stacking a first sealing layer 17a having a surface coming into contact with the air flowing in the air distribution region 30 and a second sealing layer 17b having a surface coming into contact with the fuel gas flowing in the fuel gas distribution region 31. In other words, the sealing portion 17 according to Embodiment 2 has a configuration such that the sealing portion 17 according to Embodiment 1 is divided into two layers in the Y-axis direction, and the first sealing layer 17a is disposed at a position closer to the air electrode 12 than the second sealing layer 17b does. The concentration of Ba contained in the first sealing layer 17a is preferably higher than the concentration of Ba contained in the second sealing layer 17b.

That is, as described above, $BaSi_2O_5$ and $Al_2SiO_5$ are generated in the first separator-side interface portion 50b and the first separator-side periphery 50b1 included in the first sealing layer 17a, and the bondability between the separator 16 and the sealing portion 17 is enhanced.

Here, when the concentration of Ba contained in the first sealing layer 17a is low, $Al_2O_3$ film formed on the separator 16 and Si contained in the first sealing layer 17a and the separator 16 mainly react to simultaneously generate $Al_2SiO_5$ and $BaSi_2O_5$. Accordingly, when the glass composition contains Al in an amount almost the same as or slightly lower than the equivalent ratio of $Al_2SiO_5$ to be generated, the bondability between the sealing portion 17 and the separator 16 can be improved, while minimizing the extraction of Al in the $Al_2O_3$ film formed on the separator 16. Furthermore, it is possible to suppress the decrease in the heat resistance, corrosion resistance, wear resistance, and strength of the separator 16 and to prevent the decrease in the function of suppressing scattering of Cr from the separator 16 to the air electrode 12. Accordingly, the concentration of Ba contained in the first sealing layer 17a can be increased.

In addition, as described above, $BaAl_2O_4$ and $Ba_2SiO_4$ are generated in the first electrolyte-side interface portion 50a and the first electrolyte-side periphery 50a1 included in the first sealing layer 17a. Accordingly, Ba in the electrolyte 11 is partially extracted to the first sealing layer 17a side at the time of generating these reaction products. Thus, in order to suppress extraction of Ba from the electrolyte 11, the concentration of Ba contained in the first sealing layer 17a is increased.

In contrast, in the second sealing layer 17b, with an increase in the concentration of Ba, $BaCO_3$ is readily generated by carbon (C) contained in the fuel gas and Ba contained in the second sealing layer 17b, in particular, in the portion coming into contact with the fuel gas in the electrolyte-side interface portion (second electrolyte-side interface portion 50c) and the portion coming into contact with the fuel gas in the separator-side interface portion (second separator-side interface portion 50d). In particular, the generated amount of $BaCO_3$ is increased at a temperature of 550° C., lower than the operating temperature (600° C.) of the fuel cell. Here, since generation of $BaCO_3$ in the electrolyte-side interface portion destabilizes the power generation performance of the single cell 10, the concentration of Ba contained in the second sealing layer 17b is preferred to be as low as possible. The weight proportion of Ba contained in the second sealing layer 17b is preferably 0.1 wt % or less as BaO contained in the second sealing layer 17b.

The fuel cell stack 1 of the fuel cell according to Embodiment 2 of the present disclosure may be modified as in Modifications 1 to 3 of the fuel cell stack 1 of the fuel cell according to Embodiment 1 of the present disclosure.

Embodiment 3

Figure 10:
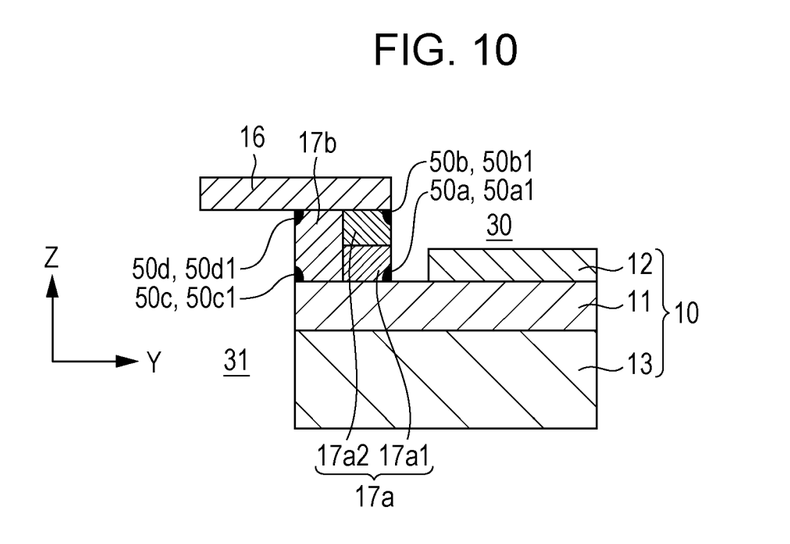
FIG. 10 is a diagram schematically illustrating an example of the configuration of the single cell, separator, and sealing portion according to Embodiment 3 of the present disclosure.

The configuration of a single cell 10, a separator 16, and a sealing portion 17 provided to a fuel cell stack 1 of a fuel cell according to Embodiment 3 of the present disclosure will now be described. In the fuel cell according to Embodiment 3 of the present disclosure, the same members as those of the fuel cell according to Embodiment 1 or 2 of the present disclosure are denoted by the same reference signs, and a detailed description thereof will be omitted.

The configuration of a fuel cell stack 1 of a fuel cell according to Embodiment 3 will now be described with reference to FIG. 10. FIG. 10 is a diagram schematically illustrating an example of the configuration of the single cell 10, the separator 16, and the sealing portion 17 according to Embodiment 3 of the present disclosure. As shown in FIG. 10, the fuel cell stack 1 according to Embodiment 3 is the same as the fuel cell stack 1 according to Embodiment 2 except that the first sealing layer 17a constituting the sealing portion 17 is composed of a third sealing layer 17a1 and a fourth sealing layer 17a2.

That is, the first sealing layer 17a according to Embodiment 3 is composed of a third sealing layer 17a1 including a first electrolyte-side interface portion and a fourth sealing layer 17a2 including a first separator-side interface portion stacked in the thickness direction (Z-axis direction) of the sealing portion 17. In other words, the first sealing layer 17a according to Embodiment 3 is composed of two layers (third sealing layer 17a1 and fourth sealing layer 17a2) divided in the thickness direction (Z-axis direction) of the sealing portion 17. The concentration of Ba contained in the third sealing layer 17a1 may be higher than the concentration of Ba contained in the fourth sealing layer 17a2. That is, it is preferable that the concentration of Ba be smaller in the order of the third sealing layer 17a1, the fourth sealing layer 17a2, and the second sealing layer 17b.

$BaSi_2O_5$ is generated in the first separator-side interface portion 50b included in the fourth sealing layer 17a2, and $Al_2SiO_5$ is generated in the first separator-side periphery 50b1. Consequently, the bondability between the sealing portion 17 and the separator 16 is improved. Here, if the concentration of Ba contained in the fourth sealing layer 17a2 is low, the $Al_2O_3$ film formed on the separator 16 and Si contained in the fourth sealing layer 17a2 and in the separator 16 mainly react to generate $Al_2SiO_5$. Here, if the amount of Si is large to generate a large amount of $Al_2SiO_5$, Al is extracted from the $Al_2O_3$ film formed on the separator 16 to reduce the Cr scattering-preventing ability of the separator 16. Accordingly, in order to suppress the generation of $Al_2SiO_5$, the concentration of Ba in the fourth sealing layer 17a2 is increased to preferentially generate $BaSi_2O_5$.

BaAl$_2$O$_4$ is generated in the first electrolyte-side interface portion 50a included in the third sealing layer 17a1, and Ba$_2$SiO$_4$ is generated in the first electrolyte-side periphery 50a1, and thereby the bondability between the sealing portion 17 and the electrolyte 11 is improved. Here, in the third sealing layer 17a1, since BaAl$_2$O$_4$ and Ba$_2$SiO$_4$ are generated, the amount of Ba consumed is larger than that in the fourth sealing layer 17a2. Accordingly, in order to suppress the extraction of Ba from the electrolyte 11, the concentration of Ba in the third sealing layer 17a1 may be higher than the concentration of Ba in the fourth sealing layer 17a2.

The ratio of Ba, Al, and Si contained in the third sealing layer 17a1 is preferably Ba:Al:Si=17:6:7, and the weight ratio thereof, in terms of oxides, in third sealing layer 17a1 is preferably BaO: 0.5Al$_2$O$_3$:SiO$_2$=78:9.2:13. The ratio of Ba, Al, and Si in the fourth sealing layer 17a2 is preferably Ba:Al:Si=2:6:7, and the weight ratio thereof, in terms of oxides, in the fourth sealing layer 17a2 is preferably BaO: 0.5Al$_2$O$_3$:SiO$_2$=30:30:40.

In contrast, in the second sealing layer 17b, as described in Embodiment 2, a smaller amount of Ba is preferred for preventing destabilization of the power generation performance of the single cell 10.

That is, in the sealing portion 17, the second sealing layer 17b may contain BaO in a proportion of 0.1 wt %, the third sealing layer 17a1 may contain BaO in a proportion of 78 wt %, and the fourth sealing layer 17a2 may contain BaO in a proportion of 30 wt %.

The fuel cell stack 1 of the fuel cell according to Embodiment 3 of the present disclosure may be modified as in Modifications 1 to 3 of the fuel cell stack 1 of the fuel cell according to Embodiment 1 of the present disclosure.

Embodiment 4

Figure 11:
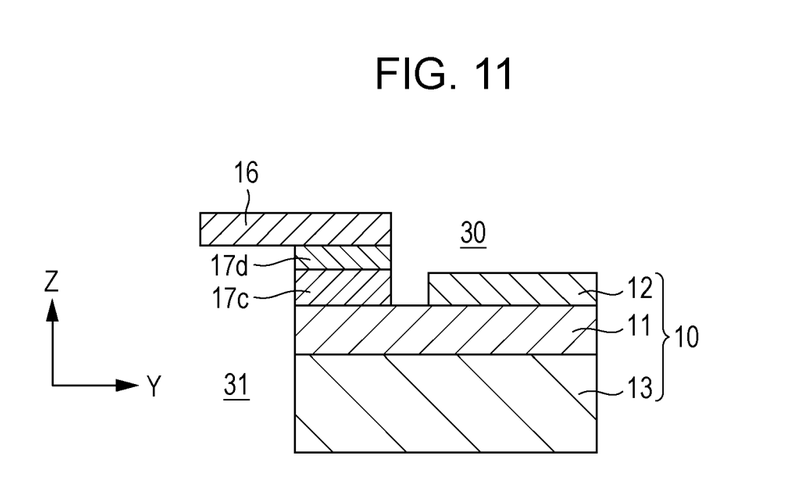
FIG. 11 is a diagram schematically illustrating an example of the configuration of the single cell, separator, and sealing portion according to Embodiment 4 of the present disclosure.

The configuration of a single cell 10, a separator 16, and a sealing portion 17 provided to a fuel cell stack 1 of a fuel cell according to Embodiment 4 of the present disclosure will now be described. In the fuel cell according to Embodiment 4 of the present disclosure, the same members as those of the fuel cell according to any one of Embodiments 1 to 3 of the present disclosure are denoted by the same reference signs, and a detailed description thereof will be omitted.

The configuration of a fuel cell stack 1 of a fuel cell according to Embodiment 4 will now be described with reference to FIG. 11. FIG. 11 is a diagram schematically illustrating an example of the configuration of the single cell 10, the separator 16, and the sealing portion 17 according to Embodiment 4 of the present disclosure. As shown in FIG. 11, the fuel cell stack 1 according to Embodiment 4 is the same as the fuel cell stack 1 according to Embodiment 1 except that the sealing portion 17 is composed of two layers (fifth sealing layer 17c and sixth sealing layer 17d) stacked in the thickness direction (Z-axis direction) of the sealing portion 17.

That is, the sealing portion 17 according to Embodiment 4 is composed of a fifth sealing layer 17c including an electrolyte-side interface portion and a sixth sealing layer 17d including a separator-side interface portion stacked in the thickness direction (Z-axis direction) of the sealing portion 17. The fifth sealing layer 17c may have different concentrations of Ba such that the concentration of Ba on the side coming into contact with the air flowing in the air distribution region 30 is higher than that on the side coming into contact with the fuel gas flowing in the fuel gas distribution region 31. Similarly, the sixth sealing layer 17d may have different concentrations of Ba such that the concentration of Ba on side coming into contact with the air flowing in the air distribution region 30 is higher than that on the side coming into contact with the fuel gas flowing in the fuel gas distribution region 31. The concentration of Ba in the fifth sealing layer 17c is lower than that in the sixth sealing layer 17d. The weight proportion of Ba contained in the fifth sealing layer 17c may be 0.1 to 1 wt %, and the weight proportion of Ba contained in the sixth sealing layer 17d may be 5 to 90 wt %.

The fuel cell stack 1 of the fuel cell according to Embodiment 4 of the present disclosure may be modified as in Modifications 1 to 3 of the fuel cell stack 1 of the fuel cell according to Embodiment 1 of the present disclosure.

In the fuel cell according to any one of Embodiments 1 to 4 of the present disclosure, a reformed gas prepared by reforming a hydrocarbon fuel gas by a reforming reaction may be supplied as a fuel gas to the fuel cell stack 1. In such a case, equipment necessary for the reforming reaction may be appropriately provided. For example, when the reforming reaction is a steam-reforming reaction, examples of the equipment necessary for the reforming reaction include a reformer, a vaporizer, and a water supply system for supplying water to the vaporizer.

The air to be supplied to the fuel cell stack 1 may be heated to about 300° C. to 700° C. by, for example, the heat generated in the fuel cell stack 1 during power generation or the heat of combustion of the air and fuel gas that have not been used for power generation.

The sealing portion provided to the fuel cell according to an aspect of the present disclosure can maintain the hermetical bonding state between the separator, for separating a fuel gas and air, and the electrolyte for a long time compared to known methods. Accordingly, the fuel cell according to the aspect of the present disclosure can maintain high power generation performance, reliability, and durability of the single cell. The sealing portion can be used for, for example, bonding a stacking member in a solid oxide fuel cell.

What is claimed is:

1. A fuel cell comprising:
a fuel single cell comprising a fuel electrode, an air electrode, and an electrolyte disposed between the electrodes;
a separator for separating a fuel gas flowing through the fuel electrode and air flowing through the air electrode; and
a sealing portion for hermetically bonding between the separator and the electrolyte, wherein:
the sealing portion is constituted of a glass composition containing at least two of metallic or metalloid elements contained in the electrolyte and at least two of metallic or metalloid elements contained in the separator,
the sealing portion has a first surface and a second surface opposite to the first surface,
the first surface is bonded to the electrolyte and the second surface is bonded to the separator,
only a lower surface of the separator facing the electrolyte contacts the sealing portion,
the electrolyte includes a proton conductor,
the proton conductor is represented by a compositional formula: BaZr$_{1-x}$M$_x$O$_3$, where $0.05 \leq x \leq 0.5$; and M is at least one selected from the group consisting of Sc, In, Lu, Yb, Tm, Er, Y, Ho, Dy, and Gd,
the separator contains Al and Si, and
the sealing portion contains Al, Ba, and Si.

2. The fuel cell according to claim 1, wherein the separator includes a metal composition having an $Al_2O_3$ film as a surface layer.

3. The fuel cell according to claim 2, wherein the metal composition is ferrite stainless steel containing Al.

4. The fuel cell according to claim 3, wherein the ferrite stainless steel includes a base material, and Al is contained in the base material in a proportion of 0.5 wt % or more and 5 wt % or less with respect to weight of the base material.

5. The fuel cell according to claim 4, wherein the base material further contains Si, and Si is contained in the base material in a proportion of 0.1 wt % or more and 1 wt % or less with respect to the weight of the base material.

6. The fuel cell according to claim 5, wherein
the proportions of Al, Ba, and Si in the sealing portion are, in terms of oxides,
$SiO_2$ in a proportion of 5 wt % or more and 95 wt % or less;
$Al_2O_3$ in a proportion of 4.9 wt % or more and 35 wt % or less; and
BaO in a proportion of 0.1 wt % or more and 90 wt % or less.

7. The fuel cell according to claim 6, wherein:
the sealing portion includes an electrolyte-side interface portion being an interface with the electrolyte and a separator-side interface portion being an interface with the separator,
the electrolyte-side interface portion includes a first electrolyte-side interface portion that is a region on the side coming into contact with the air, and a first electrolyte-side periphery that is a predetermined range from the first electrolyte-side interface portion in the thickness direction of the sealing portion,
the separator-side interface portion includes a first separator-side interface portion that is a region on the side coming into contact with the air, and a first separator-side periphery that is a predetermined range from the first separator-side interface portion in the thickness direction of the sealing portion,
the electrolyte-side interface portion includes a second electrolyte-side interface portion that is a region on the side coming into contact with the fuel gas, and a second electrolyte-side periphery that is a predetermined range from the second electrolyte-side interface portion in the thickness direction of the sealing portion,
the separator-side interface portion includes a second separator-side interface portion that is a region on the side coming into contact with the fuel gas, and a second separator-side periphery that is a predetermined range from the second separator-side interface portion in the thickness direction of the sealing portion, and
under temperature conditions of 600° C. that is the operating temperature of the fuel cell,
the first electrolyte-side interface portion contains a mixture including $BaAl_2O_4$ and $Ba_2SiO_4$,
the first electrolyte-side periphery contains a mixture including $BaAl_2O_4$ and $Ba_2SiO_4$,
the first separator-side interface portion contains a mixture including $BaSi_2O_5$ and $Al_2SiO_5$, in the mixture, the molar fraction of $Al_2SiO_5$ being higher than the molar fraction of $BaSi_2O_5$,
the first separator-side periphery contains a mixture including $BaSi_2O_5$ and $Al_2SiO_5$,
the second electrolyte-side interface portion contains a mixture including $BaAl_2O_4$ and $Ba_2SiO_4$,
the second electrolyte-side periphery contains a mixture including $BaAl_2O_4$ and $Ba_2SiO_4$,
the second separator-side interface portion contains a mixture including $BaAl_2O_4$ and $Ba_2SiO_4$, in the mixture, the molar fraction of $BaAl_2O_4$ being higher than the molar fraction of $Ba_2SiO_4$, and
the second separator-side periphery contains a mixture including $BaAl_2O_4$ and $Ba_2SiO_4$.

8. The fuel cell according to claim 5, wherein the sealing portion further includes Zr or M.

9. The fuel cell according to claim 8, wherein
the proportions of Al, Ba, Si, and Zr or M contained in the sealing portion are, in terms of oxides,
$SiO_2$ in a proportion of 5 wt % or more and 95 wt % or less;
$Al_2O_3$ in a proportion of 4.7 wt % or more and 35 wt % or less;
BaO in a proportion of 0.1 wt % or more and 90 wt % or less; and
$ZrO_2$ in a proportion of 0.1 w % or more and 5 wt % or less, or an oxide of M in a proportion of 0.1 wt % or more and 5 wt % or less.

10. The fuel cell according to claim 7, wherein the sealing portion includes Ba such that the concentrations of Ba contained in the electrolyte-side interface portion and the separator-side interface portion are higher than the concentration of Ba in the middle region between the electrolyte-side interface portion and the separator-side interface portion.

11. The fuel cell according to claim 7, wherein
the sealing portion is composed of a first sealing layer having a surface coming into contact with the air and a second sealing layer having a surface coming into contact with the fuel gas, where the sealing layers are stacked; and
the concentration of Ba contained in the first sealing layer is higher than the concentration of Ba contained in the second sealing layer.

12. The fuel cell according to claim 11, wherein
the first sealing layer is composed of a third sealing layer including the first electrolyte-side interface portion and a fourth sealing layer including the first separator-side interface portion stacked in the thickness direction of the sealing portion; and
the concentration of Ba contained in the third sealing layer is higher than the concentration of Ba contained in the fourth sealing layer.

13. The fuel cell according to claim 12, wherein
the second sealing layer includes BaO in a proportion of 0.1 wt %;
the third sealing layer includes BaO in a proportion of 78 wt %; and
the fourth sealing layer includes BaO in a proportion of 30 wt %.

14. The fuel cell according to claim 1, wherein: A fuel cell comprising:
a fuel single cell comprising a fuel electrode, an air electrode, and an electrolyte disposed between the electrodes;
a separator for separating a fuel gas flowing through the fuel electrode and air flowing through the air electrode; and
a sealing portion for hermetically bonding between the separator and the electrolyte, wherein:
the sealing portion is constituted of a glass composition containing at least two of metallic or metalloid elements contained in the electrolyte and at least two of metallic or metalloid elements contained in the separator, the sealing portion has a first surface and a second surface opposite to the first surface, the first surface is bonded to the electrolyte and the second surface is bonded to the separator, the electrolyte includes a proton conductor, the proton conductor is represented by a compositional formula: $BaZr_{1-x}M_xO_3$, where $0.05 \leq x \leq 0.5$; and M is at least one selected from the group consisting of Sc, In, Lu, Yb, Tm, Er, Y, Ho, Dy, and Gd, the separator contains Al and Si, the sealing portion contains Al, Ba, and Si, the sealing portion includes a first sealing layer bonded to the electrolyte and a second sealing layer bonded to the separator, and a Ba concentration of the first sealing layer is lower than a Ba concentration of the second sealing layer.

15. The fuel cell according to claim 14, wherein in the first sealing layer, a Ba concentration on a side coming into contact with the air is higher than a Ba concentration on a side coming into contact with the fuel gas.

16. The fuel cell according to claim 15, wherein in the second sealing layer, a B a concentration on a side coming into contact with the air is higher than a Ba concentration on a side coming into contact with the fuel gas.

17. The fuel cell according to claim 14, wherein:

the B a concentration of the first sealing layer is in a range from 0.1 wt % to 1 wt %, and the Ba concentration of the second sealing layer is in a range from 5 wt % to 90 wt %.

* * * * *